D. G. CLARK.
MEANS FOR MAKING RIVETS.
APPLICATION FILED SEPT. 9, 1909.

967,327.

Patented Aug. 16, 1910.
3 SHEETS—SHEET 1.

WITNESSES:
J. Clyde Ripley.
E. Bradford.

INVENTOR
Dwight G. Clark.
BY
ATTORNEY

THE NORRIS PETERS CO., WASHINGTON, D. C.

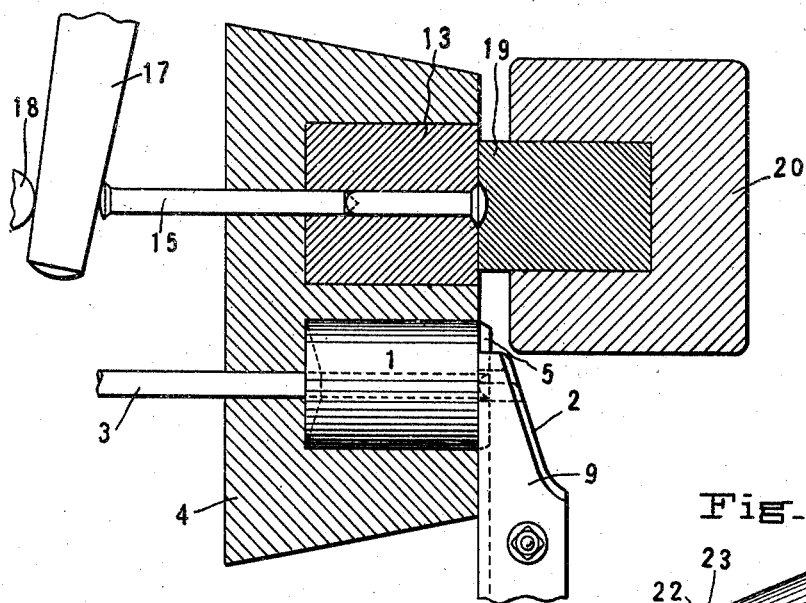
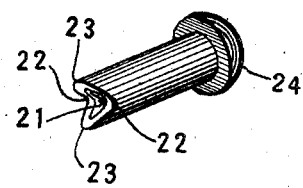
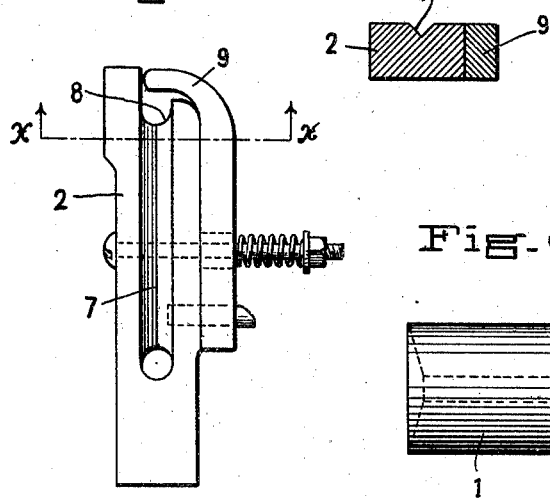
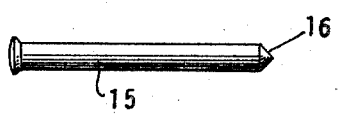
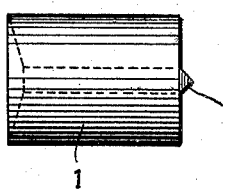
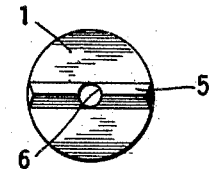

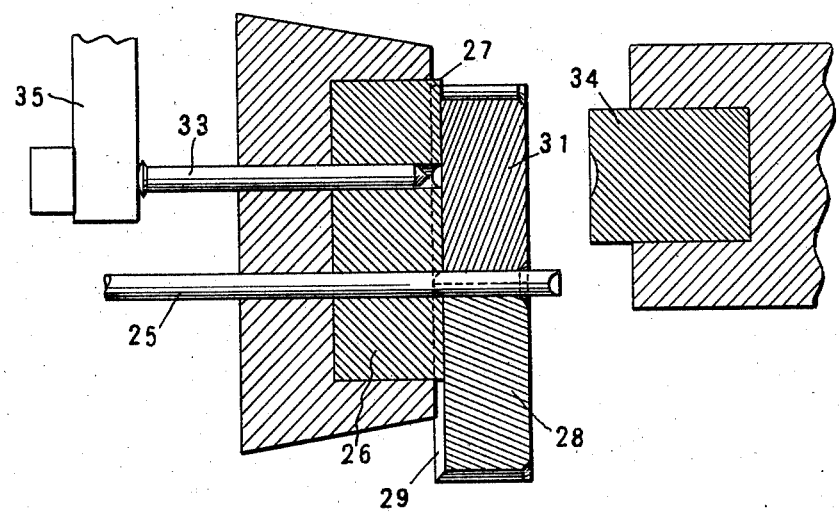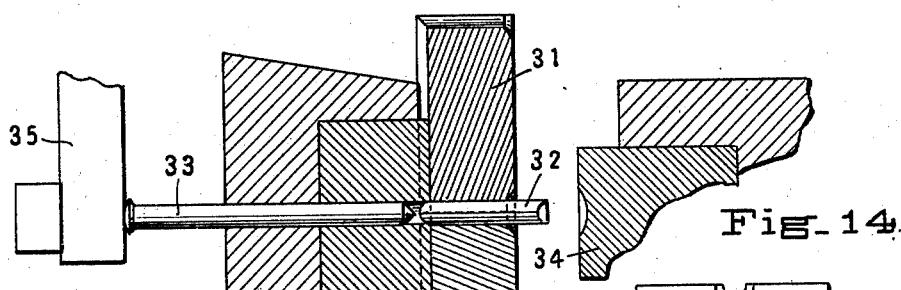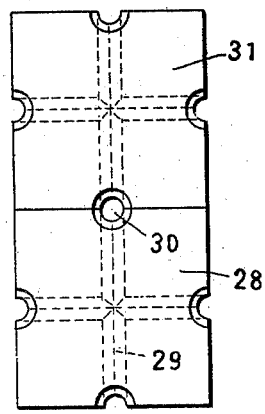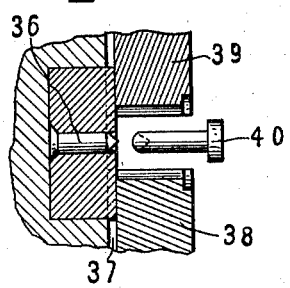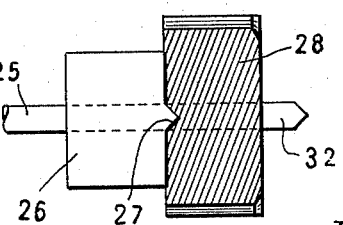

UNITED STATES PATENT OFFICE.

DWIGHT G. CLARK, OF PLAINVILLE, CONNECTICUT, ASSIGNOR TO EAGLE LOCK CO., OF TERRYVILLE, CONNECTICUT, A CORPORATION OF CONNECTICUT.

MEANS FOR MAKING RIVETS.

967,327.  Specification of Letters Patent. Patented Aug. 16, 1910.

Application filed September 9, 1909. Serial No. 516,839.

*To all whom it may concern:*

Be it known that I, DWIGHT G. CLARK, a citizen of the United States, residing at Plainville, in the county of Hartford and State of Connecticut, have invented certain new and useful Improvements in Means for Making Rivets, of which the following is a specification.

My invention relates particularly to tools for making rivets in an automatic machine of suitable type.

The improvements in mechanism are claimed in this application and the method or process of operation is claimed in my application #551,976 filed March 28th, 1910.

One object is to produce a rivet having a full round or oval head.

Another object is to produce a special form of rivet economically and yet so that it will have great strength. The preferred rivet is bifurcated at one end and has a recess extending beyond the bottom of the notch.

The new complete method in its preferred form comprises cutting off the end of the wire or rod stock so as to form a blank, wedge-shaped at one end and notched or bifurcated at the other end, then indenting the notched end and heading the wedge-shaped end of the blank. This can be carried out very simply in an ordinary rivet machine or header by employing V-shaped cutters in place of the common straight cut-off tools and a tapered or pointed knock-out pin or abutment in place of the usual flat-ended one. It will therefore be unnecessary to illustrate a complete machine.

The accompanying sheets of drawings show the necessary tools and some modifications.

Figure 1:
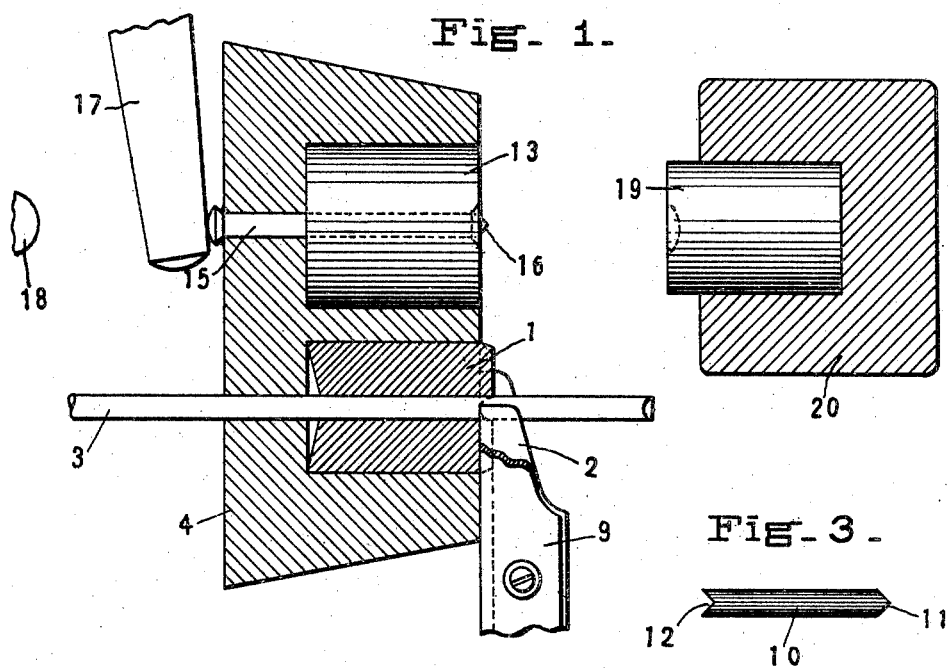
Figure 3:
Figure 2:
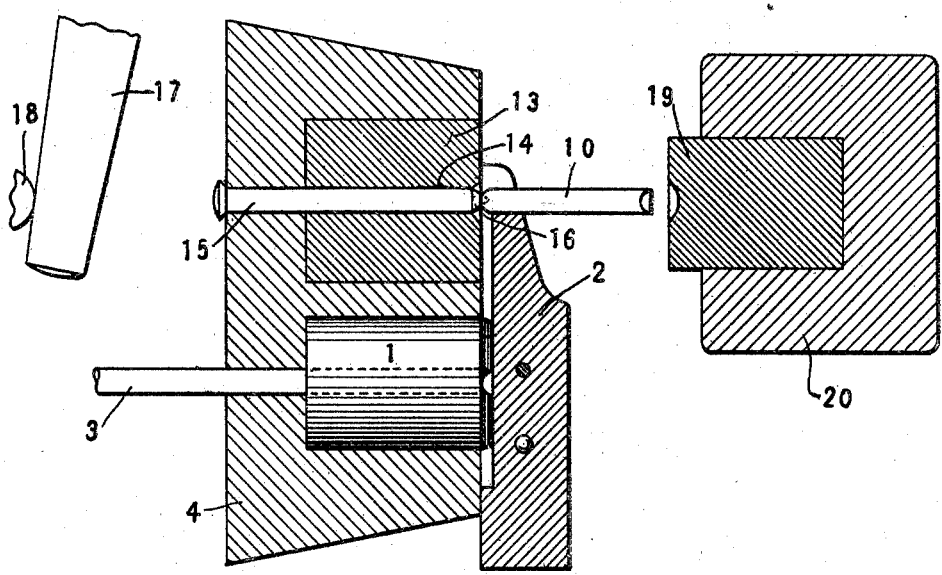

Figure 1, is a plan view and horizontal section of the tools for a solid die header showing the parts in position to cut off the stock and form a blank, the forming dies being shown in full. Fig. 2, is a plan view and horizontal section of the same parts, the blank being severed and transferred to the forming dies which are shown in section, the stationary cutter being shown in plan. Fig. 3, is a side view of the severed blank. Fig. 4, is a plan view and horizontal section of the same tools showing the rivet formed and the movable cutter in position permitting the feeding of the stock. Fig. 5, is a perspective view of a completed rivet. Fig. 6, is a side view of the stationary cutter. Fig. 7, is an end view of the same. Fig. 8, is a rear view of the movable cutter. Fig. 9, is a section of the same on the line X—X of Fig. 8 looking in the direction of the arrows. Fig. 10, is a side view of the pointed pin serving as an abutment and knock-out. Fig. 11, is a horizontal section of tools for an open die header the position of the parts corresponding with those in Fig. 1. Fig. 12, is a horizontal section of the same, the blank being severed and in position for forming. Fig. 13, is a side view and vertical section of the stationary and movable cutters respectively of Figs. 11 and 12. Fig. 14 is an end view of the movable cutters of Figs. 11, 12 and 13. Fig. 15, is a horizontal section of a modification of the tools of Figs. 11 to 13.

In the form of solid die header the cutters consist of the stationary tube or block 1 and the intermittently movable slide 2. The stock 3 is fed intermittently through the holder 4 and block 1 as usual. The outer end of the block 1 is provided with a wedge shaped projection 5 affording a cutting edge 6 angular in cross section (see Figs. 6 and 7). The slide 2 has a groove 7 of the same cross section affording a corresponding cutting edge 8 (see Figs. 8 and 9). The usual spring pressed gripping finger 9 may be employed for holding the blank at the end of the slide 2 (see Fig. 8). The slide 2 is operated in the usual manner and cuts off the end of the stock to form blanks such as 10 which are thus wedge-shaped at the front end 11 and grooved or notched at the rear end 12 (see Fig. 3). The solid die 13 has a recess or passage 14 to receive the blank 10 and the hardened knock-out pin 15 which is tapered or pointed at the front end 16. The pin is operated as usual by an arm 17. A stop 18 may be provided. The blank 10 is carried over in front of the die recess 14 by the slide 2 and finger 9. The header 19 is carried by its holder or slide 20 and has a heading recess and is operated in the ordinary manner. The header 19 pushes the blank 10 into the die recess 14 and forces the end 12 against the pin point 16. The pin is thus pushed in until it strikes the arm 17 which is then stationary against the stop 18 (see Fig. 2). The forcing of the blank onto the pin drives the point into the bottom of the notch or groove of the blank and, causing some of the metal in the center of the notch to flow slightly toward the edges, forms a conical recess 21 (see Fig. 5) in the end of the shank with the webs 22, 22 connecting the prongs 23, 23 and compresses the metal thus strengthening it. The continued movement (to the left in the drawings) upsets the wedge-shaped outer end 11 of the blank and forms the head 24. The wedge-shaped end 11 of the blank swages up into a full round or oval headed rivet with much less pressure than is required by ordinary processes. The head may be made of other shapes, however if desired, so far as the other features of the invention are concerned by using a header with the proper recess. The solid die prevents the prongs 23, 23 from spreading when driven onto the abutment point 16.

In the open die form shown in Figs. 11 to 14 the stock 25 is fed through the block 26 which has a wedge-shaped projection 27 whose edges, where the stock extends to the right, form a cutting edge. The cutter block 28 has a groove 29 with a cutting edge at 30. Block 31 in conjunction with block 28 serves to hold the blank 32 as it is being cut off and they transfer it over in front of the pointed pin 33. The header 34 then drives the blank on to the point of the pin 33 (see Fig. 12) to form the recess in the grooved or notched end of the blank. The blocks 28 and 31 hold the blank as the header 34 upsets the outer end of the blank to form the head of the rivet (not shown). The pin 33 may be operated by the arm 35 to knock out the finished rivet if desired. The blocks 28 and 31 are usually made alike and each is reversible for purposes of economy. Instead of using a knock-out pin, the pointed abutment 36 may be stationary as shown in Fig. 15, the point being in line with the groove 37 of the dies 38 and 39. When the dies are separated the finished rivet 40 will fall out or may be blown or knocked out in any suitable manner. This method as performed results in a rivet having prongs at one end connected at the sides by shallow webs which when the rivet is used produce a head round or slightly oval in end view having great strength and holding power.

The angles of the cutting edges 6 and 8 may be 90° more or less so as to produce greater or lesser upsetting portions in the blank. The length of the wedge 11 is practically the same as the depth of the notch 12 allowing for the slight drawing action of the cutters in ordinary practical operation. This dimension I prefer should be less than the diameter of the stock in order to prevent any possibility of deflection or curling in the upsetting action. The angle of the abutment 16 is preferably the same as or slightly less than the angle of the notch 12. The pin 15 need not come to an exact point and in fact if pointed at the start will soon wear off slightly. It is sufficient if the end be given a substantial taper so as to drive into the notch 12 and force some of the metal from near the center outwardly toward the edges of the notch and form a conical indentation.

The tapered or wedge-shaped end 11 of the blank fills the rounded recess of the header much better than a square ended blank would do. The particular shape of the heading recess may however be made in accordance with the shape of the desired product.

What I claim is:—

1. In a rivet machine of suitable character operating cutters having cutting edges angular in section for cutting off a forked blank from the end of stock, a tapered abutment for entering the forked end and making a conical depression therein and a header adapted to engage the opposite end of said blank.

2. In a suitable rivet machine, a stationary cutter having an angular cutting projection, a cutting slide having a corresponding groove and a cutting edge for forming a blank with a forked end, a tapered abutment for entering the forked end of the blank and a header having a rounded heading recess for engaging the opposite end of the blank.

3. In a suitable rivet machine, a stationary cutter having a passage for the stock and an angular cutting projection at one end, a cutting slide having a grooved and angular cutting edge and movable substantially at right angles to the stock passage in the stationary cutter for forming a blank wedge-shaped at the outer end and forked at the rear end, an abutment for the forked end and a header having a rounded heading recess for upsetting the wedge-shaped end.

4. In a suitable rivet machine, a stationary cutter having an angular cutting projection, a cutting slide having an angular cutting edge corresponding thereto for forming a blank with a forked end, a tapered abutment for forming a conical recess in the forked end and a header for upsetting the opposite end of said blank.

5. In a suitable rivet machine, coöperating cutters having angular cutting edges and a feed passage for the stock for forming a blank wedge-shaped at one end and forked at the opposite end, an abutment for the forked end and a header with a rounded heading recess for upsetting the wedge-shaped end.

6. In a suitable rivet machine, coöperating cutters having angular cutting edges and a stock feeding passage longitudinal of the cutters whereby a blank is formed forked at one end and wedge-shaped at the other end, a tapered abutment for forming a conical recess in the forked end and a header having a rounded heading recess for upsetting the wedge-shaped end.

7. In a suitable rivet machine, coöperating cutters having angular cutting edges for forming a blank wedge-shaped at one end and forked at the opposite end and a tapered abutment for forming a conical recess in the forked end and a header for upsetting the opposite end.

8. In a suitable rivet machine, coöperating cutters having angular cutting edges for forming a blank forked at one end, a header for upsetting the opposite end and a longitudinally movable tapered knock-out pin for forming a conical recess in the forked end.

DWIGHT G. CLARK.

Witnesses:
G. C. LEES,
A. V. BROCK.